L. H. PERLMAN.
WHEEL.
APPLICATION FILED AUG. 16, 1917.
1,434,222.
Patented Oct. 31, 1922.
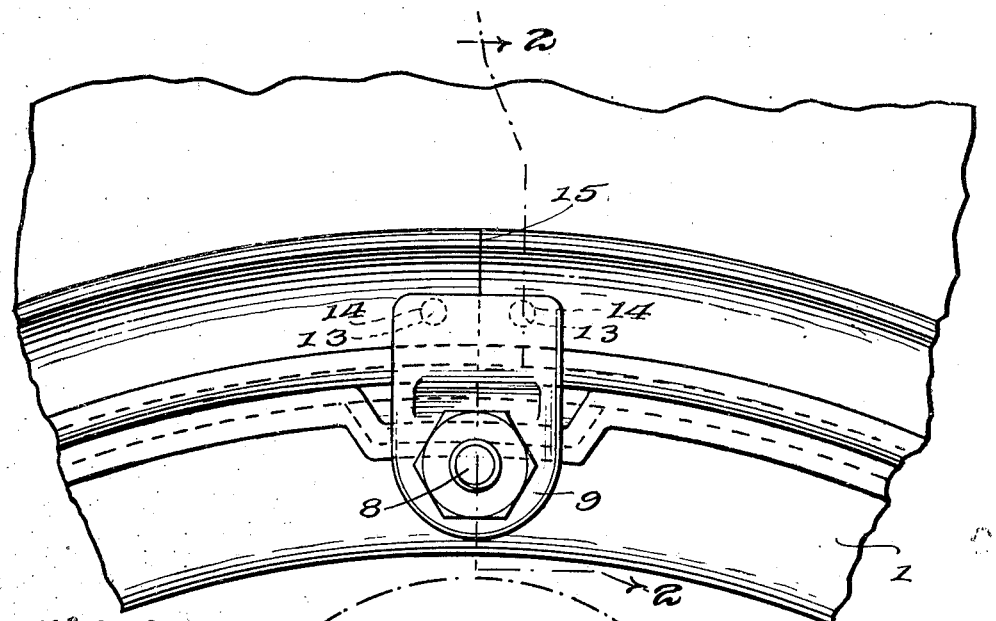
Fig. 1.
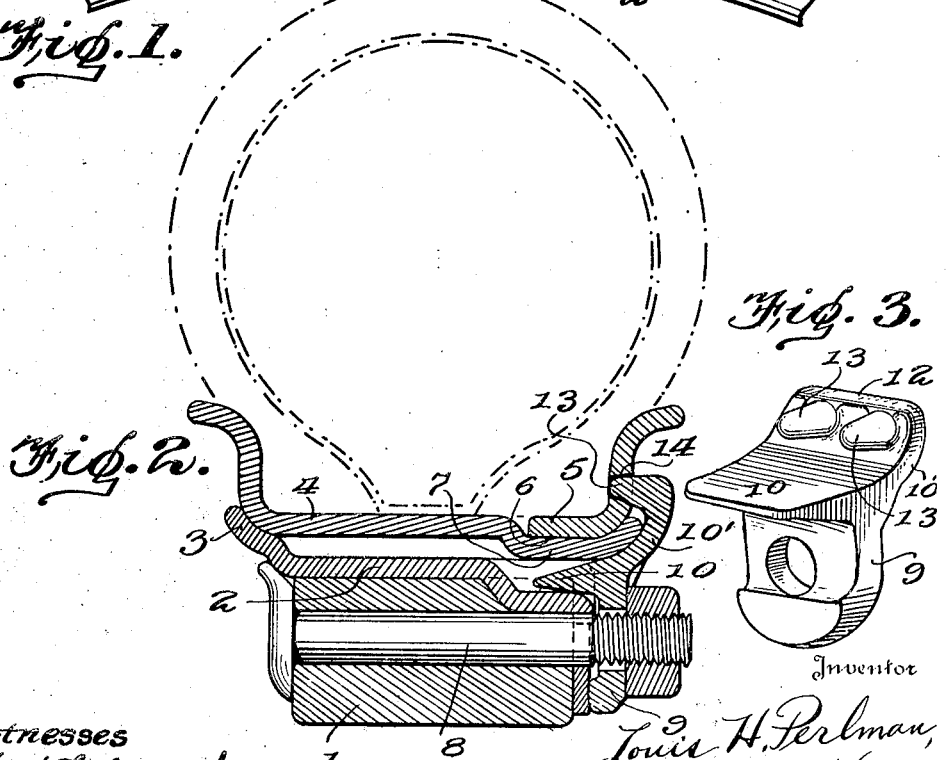
Fig. 2.
Fig. 3.
Witnesses
H. N. Lybrand
C. H. Pesler
Inventor
Louis H. Perlman,
Edgar W. Kitchin
Attorney Patented Oct. 31, 1922.

1,434,222

UNITED STATES PATENT OFFICE.

LOUIS H. PERLMAN, OF NEW YORK, N. Y., ASSIGNOR TO GENERAL MOTORS CORPORATION, A CORPORATION OF DELAWARE.

WHEEL.

Application filed August 16, 1917. Serial No. 186,531.

*To all whom it may concern:*

Be it known that I, LOUIS H. PERLMAN, a citizen of the United States, residing at New York, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in wheels, and more particularly to the peripheral portion of that type of wheel provided with a demountable rim such as is in common use on automobiles.

The object in view is the provision of simple, effective and inexpensive means for enabling the application and removal of a tire having inextensible beads to a demountable rim, and a further object is the effective locking of the demountable rim onto the body of a wheel in a simplified but effectual manner.

With these and further objects in view as will in part hereinafter become apparent and in part be stated, the invention comprises certain novel constructions, combinations and arrangements of parts as subsequently specified and claimed.

In the accompanying drawing,—

Figure 1 is a view in side elevation of a fragment of the peripheral portion of a wheel embodying the features of the present invention.

Figure 2 is a cross section therethrough taken on the planes indicated by line 2—2 of Figure 1.

Figure 3 is a perspective view of the rim and flange lock.

Referring to the drawing by numerals, 1 indicates the felly, and 2 the fixed rim or felly band of a wheel. The band 2 is provided with the usual supporting stop flange 3 adapted to receive and sustain one edge of the demountable rim 4. The rim 4 is shown as provided with a conventional "straight-side" flanges, but, of course, the flanges may be of any preferred contour according to the tire to be used. To provide, however, for the application and removal of tires having non-elastic beads, one of the flanges is formed integral with the base of rim 4, and the other is formed integral with a flange ring 5 which is seated in an annular recess 6 formed in the base of rim 4. The recess 6 is merely a relatively wide annular depression or offset having a perfectly flat outer surface parallel to or substantially parallel to the outer face of the main portion of the base of rim 4, but offset therefrom a distance equal to the thickness of the ring 5. This offset or depression produces an annular bead 7 at the inner face of the base of rim 4, and the parts are preferably dimensioned to have said bead contact with or substantially contact with the outer surface of the band 2 so as to serve to center the rim 4 on the band 2 when the rim is being applied thereon. The rim 4 is locked in its operative position by a series of side wedges spaced apart substantially uniformly about the wheel and retained by engagement with bolts 8 anchored in the felly 1. There is shown in the accompanying drawing but one of these wedges, and this particular wedge is of peculiar construction as will hereinafter be pointed out for providing a lock for the flange of ring 5, the other wedges of the structure having no such ring-engaging part but being otherwise identical with the wedge shown. This wedge member consists of the usual side plate 9 through which the bolt 8 extends, the side plate having the usual axially extending wedging projection 10. This projection is adapted to extend beneath and engage the under surface of the rim 4 at its outer edge portion for exerting a wedging pressure thereon in directions for pressing the rim against the stop flange 3, and at the same time pressing it radially outward for tensioning the rim on the wheel. Since the bead 7 would interfere with the ready introduction of a wedge between the rim 4 and the band 2, I preferably form depressions in the outer edge portion of band 2 as indicated at 11 for accommodating the inwardly projecting portions of the wedges 10. Each of the wedges 10 is rounded up at the point 10' to afford a purchase against the outer curved portion of rim 4 at the outer edge of the depression 6, and the particular wedge shown in the drawing extends beyond the upwardly curved projection 10' and is formed with an upstanding flange 12. The flange 12 is provided with a pair of spaced axially inwardly-extending projections or pins 13 arranged to enter apertures 14 in the flange of ring 5. The ring 5 and its flange are cross-cut as indicated at 15 between the apertures 14, and the pins 13 serve effectively to hold the ends of the flange and ring against separation or other dislocation.

It is to be noted that the depression 6 is relatively shallow and wide and is not in communication with any abrupt groove or narrow recess and that the shoulders of the base of rim 4 leading into and out of the recess 6 are rounded so that there is no obstruction offered to the movement of a tire bead across the groove. It will descend into the groove and be lifted out of the groove with facility, and with no liability of lodgment or injury.

What is claimed is:—

1. In a wheel structure, the combination with the peripheral portion of a wheel body, of a demountable rim mounted thereon and having a cross-cut detachable flange, and a wedge for locking the rim to the peripheral portion of the wheel body, said wedge being formed with means adapted to engage the ends of the detachable flange for retaining them against dislocation.

2. In a wheel structure, the combination with the peripheral portion of a wheel body, of a demountable rim mounted thereon and having a cross-cut detachable flange, the flange being formed with an aperture at each side of the cross-cut, and a locking wedge for the rim having projections engaging the apertures of the detachable flange.

In testimony whereof I affix my signature in presence of two witnesses.

LOUIS H. PERLMAN.

Witnesses:
I. B. LEIBSON,
E. M. FRÜHLING.